United States Patent
Collins, Jr.

[15] 3,656,349
[45] Apr. 18, 1972

[54] REACTION CONTROL AND SAMPLING APPARATUS

[72] Inventor: Henry R. Collins, Jr., Bartlesville, Okla.
[73] Assignee: Phillips Petroleum Company
[22] Filed: Aug. 25, 1969
[21] Appl. No.: 870,747

Related U.S. Application Data

[62] Division of Ser. No. 441,675, Mar. 22, 1965, abandoned.

[52] U.S. Cl. .................................................. 73/421 B
[51] Int. Cl. ....................................................... G01n 1/14
[58] Field of Search ............. 73/421 B, 422, 422 TC, 421.5 A

[56] References Cited

UNITED STATES PATENTS

| | | |
|---|---|---|
| 2,682,277 | 6/1954 | Marshall et al. .................. 73/421.5 A |
| 3,106,843 | 10/1963 | Luxl .................................. 73/421.5 A |
| 3,282,113 | 11/1966 | Sachnik ................................. 73/422 |
| 1,364,035 | 12/1920 | Carter .................................... 73/422 |
| 3,108,094 | 10/1963 | Morgan ................................ 260/94.9 |
| 3,106,096 | 10/1963 | Broerman ......................... 73/422 TC |
| 3,201,995 | 8/1965 | Griffith et al. ......................... 73/422 |

OTHER PUBLICATIONS

Scheldknecht, Polymer Processes, Interscience Publishers Inc., New York 1956, P169 TP156 P6SC

*Primary Examiner*—S. Clement Swisher
*Attorney*—Young and Quigg

[57] ABSTRACT

A sampling system including sample probes for withdrawing and inactivating samples obtained from a reacting mixture with a reaction inactivating agent includes means for injecting inactivating agent into the sample during withdrawal without injecting inactivating agent into the reactor itself.

5 Claims, 6 Drawing Figures

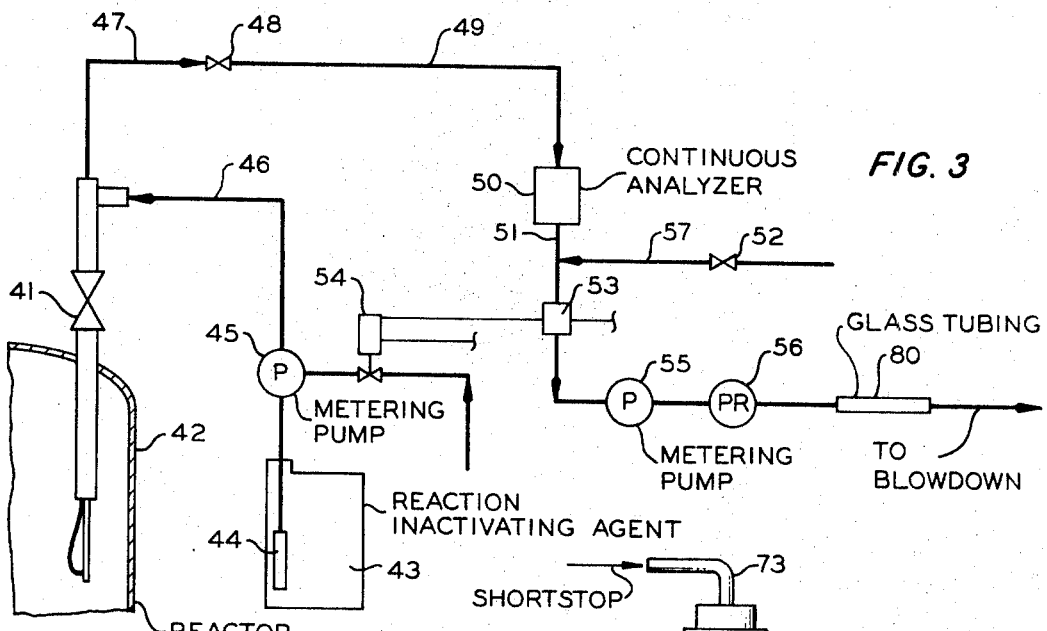
FIG. 3
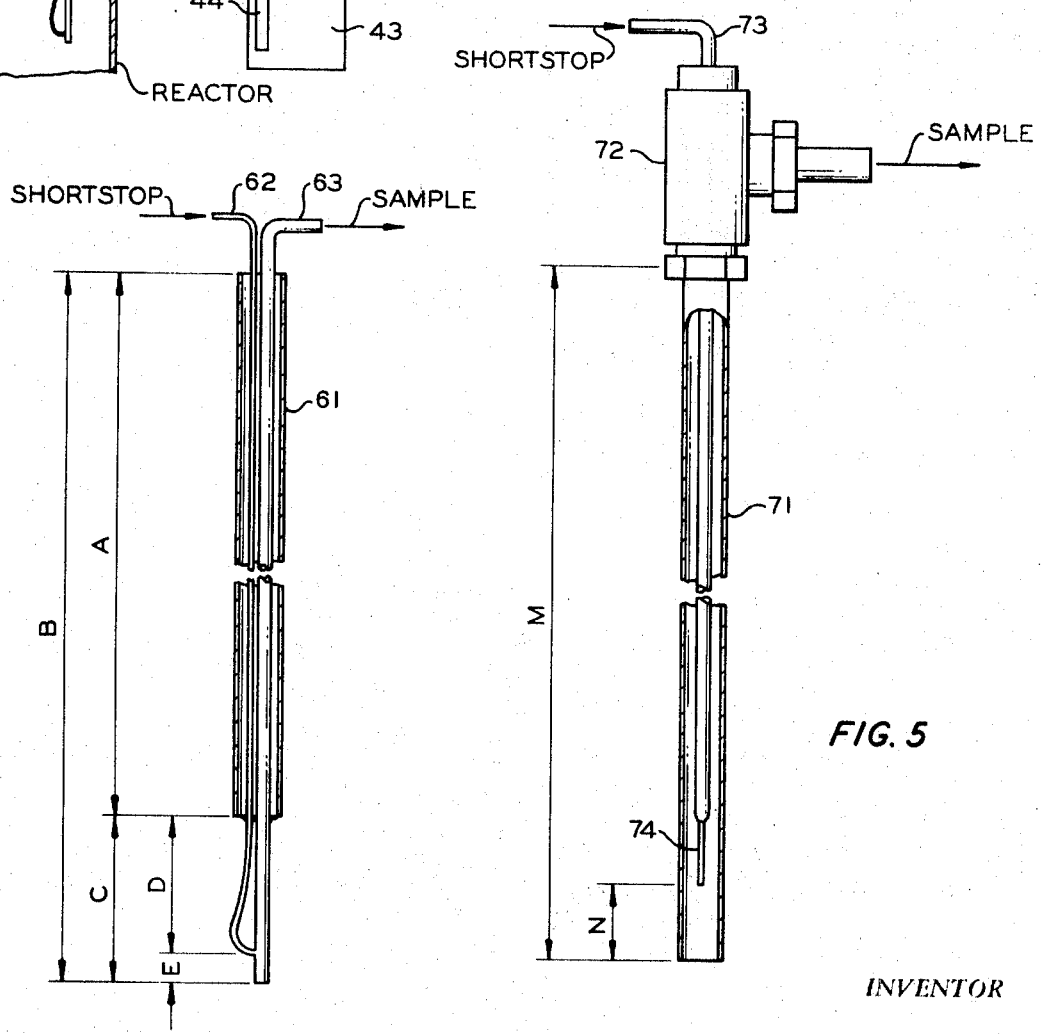
FIG. 4
FIG. 5

INVENTOR
H. R. COLLINS JR.
ATTORNEYS

REACTION CONTROL AND SAMPLING APPARATUS

This is a divisional application of my copending application having Ser. No. 441,675, filed Mar. 22, 1965, now abandoned.

This invention relates to control of a reaction.

In one of its aspects, this invention relates to a method of removing a sample from a reaction by adding a reaction inactivating material to the sample. In another of its aspects, the invention relates to an apparatus for obtaining a sample from a reaction zone, including means for adding a reaction inactivating or neutralizing material to the sample. In still another more specific aspect, the invention relates to a process sample probe apparatus having provision for a process inactivating injection means near the point of sample entry.

In the prior art, it has been difficult and sometimes impossible to obtain a sample from a chemical process, e.g., a reaction process, due to the tendency of the reactant materials to continue reacting after a sample has been taken. For example, in a polymerization process, if it is desired to know at any point during the reaction what percentage of reactants have reacted to produce polymer, it is necessary to take a sample from the reaction mixture. However, as hereinbefore pointed out, unreacted monomer may continue to react in the sampling or testing apparatus, thereby rendering impossible an accurate determination of the amount of monomer reacted. One attempted solution to the above problem has been to utilize a continuous sample line from a reaction zone. However, this has resulted in some instances in the plugging of the reaction line by the continued reaction taking place in the sample line and thereby producing solid products.

I have now discovered a method whereby the sample can be taken from a reacting mixture.

By various aspects of this invention, one or more of the following or other objects can be obtained.

It is an object of this invention to provide a method for obtaining a non-reactive sample from a reaction mixture.

It is another object of this invention to provide a method and apparatus whereby a reaction sample can be accurately measured.

It is a further object of this invention to provide an economic sampling means for various chemical and reaction processes.

Another object of this invention is to provide apparatus for sampling a reaction mixture wherein plugging and stoppage problems are eliminated.

Other aspects, objects, and the several advantages of this invention are apparent from a study of this disclosure, the drawing and the appended claims.

According to the invention, there is provided a method and apparatus for obtaining a non-reactive sample from a process wherein an inactivating medium is added to the sample at a point near the sample removal location to inactivate the sample.

According to the method of this invention, a sample from a reaction process or a reaction mixture is obtained by withdrawing by a suitable means a reactive sample, and introducing a reaction mixture inactivating medium into the sample thus taken, substantially within a time that will render the sample unreactive so that the properties of the material as sampled will not be changed.

Although the invention can be used for a great number of reaction processes, or other processes, wherein property characteristics of a reaction or process mixture can be rendered unchangeable by insertion of an inactivating agent, the invention has been found to be particularly useful in chemical reactions such as polymerization reactions. In the case of polymerization reactions such as, for example, polyolefin processes conducted in the presence of a catalyst, reaction process inactivating materials are added to the reaction mixtures to affect the catalyst. These inactivating agents are sometimes called catalyst "poisons" or "shortstop agents."

The method of the invention can be applied to various reactions or reaction processes. Broadly, the invention is applicable to any reaction wherein the properties of a sample have a tendency to change and the addition of a medium or agent to the sample will render the sample unreactive, and will eliminate the tendency to change. As has hereinbefore been pointed out, the invention is particularly applicable to polymerization reactions.

In accordance with the practice of this invention, there is provided an apparatus for removing a sample from a reaction zone, which includes, in combination, a first means for removing a sample and a second means for inserting a reaction inactivating material or agent near the point of entry of the sample and of the first sample removing means. Preferably, the apparatus is a probe which can be inserted into a reaction mixture, although various other modifications and embodiments can be used. As will be hereinafter described, the probe can consist of a tube having any cross-sectional geometric configuration for removing a sample and a second tube having any geometric cross-sectional configuration for inserting an inactivating material near the open end of said sample removal tube inserted in a shielding cover or tube and parallel with the sample removal tube or disposed concentrically inside the sample removal tube.

Further, in accordance with the practice of this invention, there is provided an apparatus for sampling and measuring a reaction mixture, comprising in combination, sample probe means, inactivating material metering means, a metering pump to measure the inactivating material flow, a pressure switch to control the flow of the sample with which the inactivating material has been mixed, a backpressure regulator to further control the flow of the sample with which the inactivating medium has been mixed, a flushing connection for the sample tube so that the sample tube can be flushed when it becomes clogged, and a continuously operating analyzer instrument, such as a viscometer, the pressure switch being operably connected to the metering pump so that if the sample removal line becomes clogged with reactive materials, the pump can be adjusted to control or stop the flow of the inactivating medium. The inactivating materials are selected from catalyst deactivators or poisons well known in the art and include lower aliphatic alcohols, such as methanol, ethanol, propanol, isopropanol, pentanol; carbonyl compounds such as acetone, acetyl acetone, acetonyl acetone, butanone, hydroquinone; acids such as rosin acids, higher fatty acids such as oleic, paimitic, dissolved in suitable solvents which will mix readily with the reaction components, such as aliphatic hydrocarbons, including pentane, hexane, heptane, cyclohexane or mixtures thereof or aromatic hydrocarbons such as benzene and toluene. The listing is not intended to be limiting in this application.

The invention will be more fully understood with reference to the accompanying drawings in which:

FIG. 3 is a diagrammatic representation of an automatically controlled sampling system according to the invention;

FIG. 4 is a drawing of one embodiment of the probe used in the practice of the invention;

FIG. 5 is a second embodiment of the probe used in practice of the invention.

Figure 1:
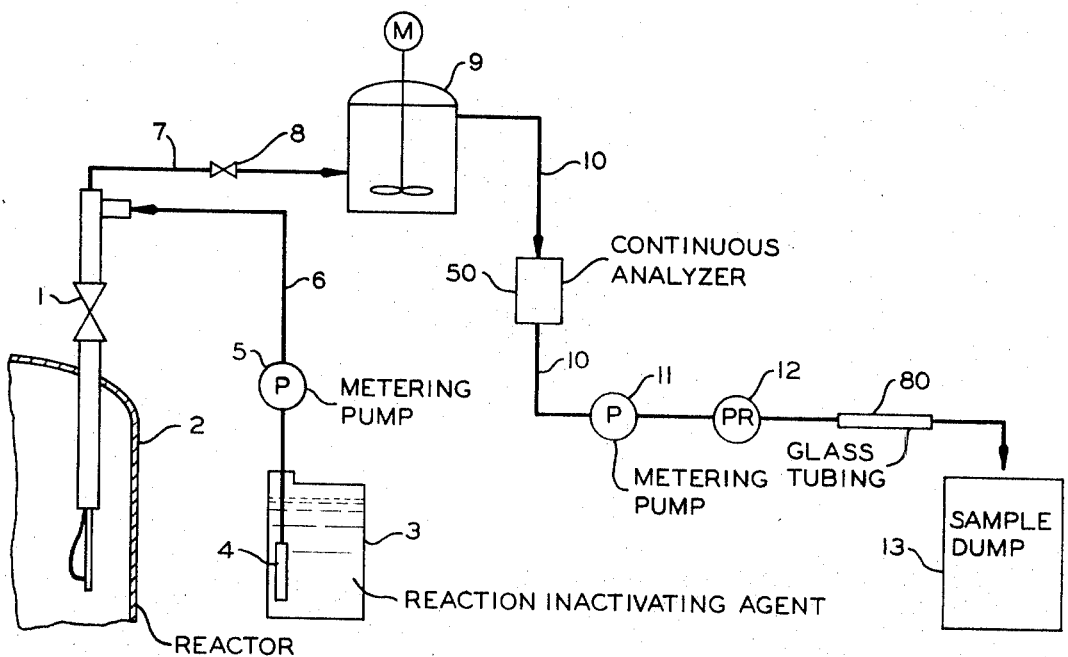
FIG. 1 is a diagrammatic representation of the sampling system of the invention.

Referring now to FIG. 1, probe 1 is inserted in reactor 2. Reaction inactivating agent in container 3 is pumped through filter 4, through metering pump 5, conduit 6, to probe 1. The reaction sample with which the reaction inactivating agent has been mixed is removed through conduit 7, valve 8, and is introduced in mixer 9 wherein the reaction inactivating agent and the sample are thoroughly mixed. The sample from the mixer 9 is transported by conduit 10, a continuous analyzer 50, such as a viscometer, through metering pump 11, backpressure regulator 12, to sample dump 13. It has been found that mixer 9 can be deleted from the system without deleteriously affecting the operation of the system if sufficient mixing takes place in the sampling line. A glass tube, element 80, can be inserted in each of the sample removal lines so that polymer building up can be observed. It has been observed that a deposit will preferentially form on the glass surface before line plugging takes place.

Figure 2:
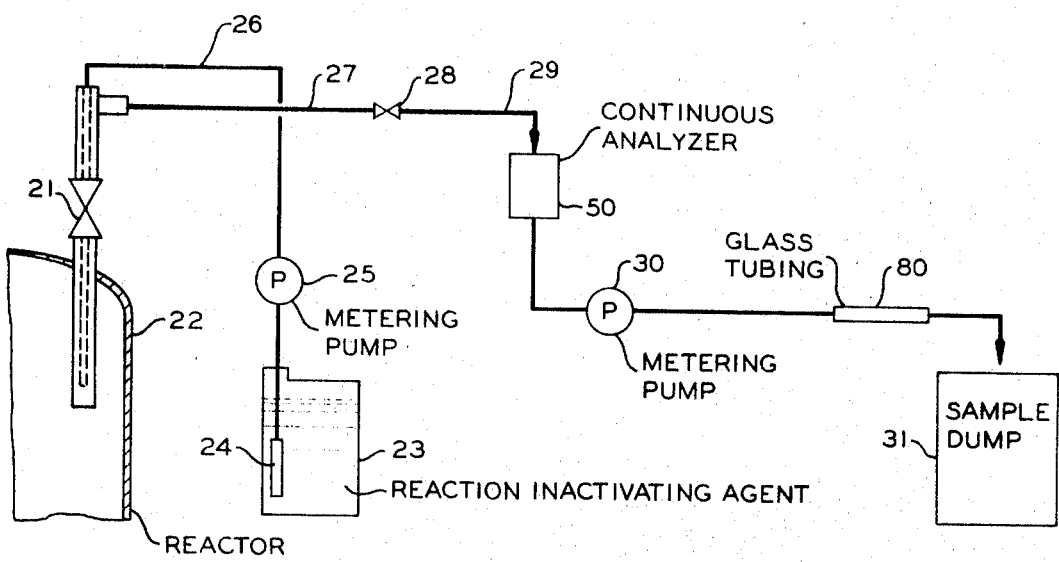
FIG. 2 is a diagrammatic representation of another sampling system of the invention.

Referring now to FIG. 2, sample probe 21 is inserted in reactor 22. Reaction inactivating agent in container 23 is pumped through filter 24 through metering pump 25 and conduit 26 where it is introduced into the probe assembly 21. The reaction mixture sample to which the reaction inactivating agent has been added is removed from the sample probe via conduit 27, through valve 28, and is passed through conduit 29 to continuous analyzer 50 and through metering pump 30, to sample dump container 31. If desired, a mixer (not shown) can be added to the system between valve 28 and analyzer 50.

In FIG. 3, sample probe 41 is inserted in reactor 42. Reaction mixture inactivating agent container in container 43 is pumped through filter 44, metering pump 45, conduit 46, and introduced to the sample probe 41. The reaction mixture sample to which the reaction inactivating agent has been added is withdrawn through conduit 47, through valve 48, conduit 49, and introduced to continuous analyzer 50, such as a viscometer. The sample to which the reaction inactivating agent has been added is then withdrawn via conduit 51. Low pressure switch 53 is provided in conduit 51. The switch is operably connected to valve 54 which controls the air drive to pump 45. In operation, the pressure switch can be used to stop the reaction inactivating agent flow if sample flow through the system is stopped due to plugging. A means for flushing is provided by pressurized line 57 through valve 52 into the sampling system which introduces a suitable flushing material. Inactivated sample in conduit 51 is passed through metering pump 55 and backpressure regulator 56. The sample is then introduced to a suitable blowdown or sample dump means (not shown).

The pump designated by elements 5, 45 and 25 in the foregoing figures can be explosion proof with the pump piston connected to a diaphragm. An air supply of 20 to 30 p.s.i. is supplied to the diaphragm through a three-way electric valve, shown as element 54 in FIG. 3. A magnet operated switch supplies DC power to the three-way valve at 48 cycles per minute. The pumping rate can be changed by adjusting piston travel and by changing the 8 r.p.m. motor drive in the wheel containing six magnets. The pump will pump against pressures in excess of 600 p.s.i.

It will be understood that the foregoing drawings are diagrammatic in feature and are included for illustrative purposes only. Conventional apparatus except as hereinbefore described such as pumps and control instruments, etc., have, for the most part, been omitted for the sake of simplicity.

Referring now to FIG. 4, one embodiment of a probe in accordance with this invention is shown. The probe is formed of an outer shell 61 in which are disposed reaction mixture inactivating agent insertion tube 62, and sample removal tube 63. The outer shell 61 is terminated at a distance from the end of the sample removal tube 63. At this point, suitable sealing or fastening means such as solder can be used to fasten tubes 62 and 63 to outer shell 61. Reaction inactivating agent insertion tube 62 intersects sample removal tube 63 at a point near the end of sample removal tube 63. In operation, reaction inactivating agent is pumped through tube 62 and contacted with the sample which enters sample removal tube 63 at the point of intersection of tubes 62 and 63. Although tubes of various sizes and composed of different materials can be used, a particularly desirable construction of the probe has been with stainless steel tubing. One suitable construction is to use 1/16 inch stainless steel tubing for reaction inactivating agent insertion tube 62, ⅛ inch stainless steel tubing for sample removal tube 63, and 5/16 inch stainless steel tubing for outer shell 61. It is desirable to use a packing gland (not shown) with the probe when it is inserted in a reactor. The various relationships of the tubes 61, 62 and 63 to each other, as depicted by dimensions A, B, C, D and E on the drawing, can be varied to obtain such things as desired penetration in the reactor, extension of sample removal tube, etc.

In FIG. 5, another embodiment of the sample probe in accordance with this invention is shown. The probe comprises outer shell 71 connected to tubing tee 72. Inserted in the outer shell is reaction inactivating agent insertion tube 73 having inserted in the lower end a tube of smaller diameter herein called reducing tube 74. In operation, the probe is inserted into a reaction mixture and a sample is taken through outer shell 71. Reaction inactivating agent is inserted through tube 73, reducing tube 74, and is introduced to the sample stream at a point within the length of outer shell 71. The deactivated sample is then withdrawn from the sample probe through tubing tee 72. Various sealing and positioning means can be used to position the reaction inactivating agent insertion tube in relation to outer shell 71, such as for example, solder. Although various details and tubings can be used to construct the probe, suitable materials are ⅛ inch stainless steel tubing for the reaction inactivating agent insertion tube 73 coupled to a 5/16 inch tubing tee which is coupled to 5/16 inch stainless steel tubing which comprises the outer shell 71. Reducing tube 74 can be connected to tube 73 by any suitable fastening or sealing means such as solder. If a 5/16 inch stainless steel tube is used for reaction inactivating agent insertion tube 73, reducing tube 74 can desirably be 1/16 inch stainless steel tubing. The relationships of the various tubes can be adjusted to any desirable dimension as depicted by dimensions M and N. Although it is not shown, a packing gland is preferably used when the tube is inserted into a reaction medium or a reaction vessel.

Figure 6:
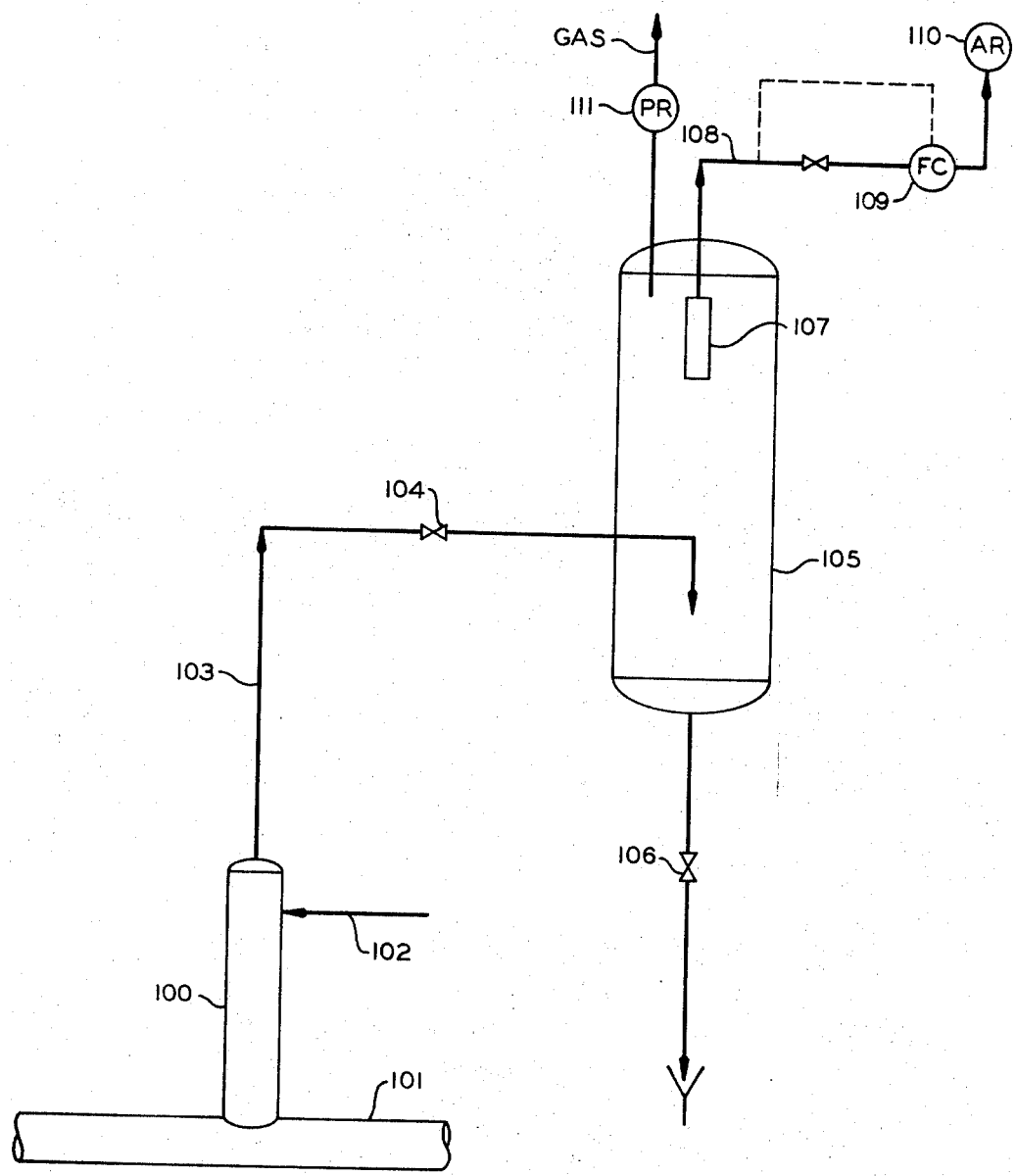
FIG. 6 is an alternative sampling system in accordance with the invention.

Among the advantages of the foregoing described embodiments is the fact that there is no possibility for the main portion of the reaction mixture into which the probe is inserted to be deactivated by inadvertent contact with reaction inactivating agent. It will be apparent from the drawings that the reaction inactivating agent comes in contact only with the sample after it has entered the sample tube. To avoid any contact of the reaction inactivating agent with the reaction mixture from which a sample is to be taken, the dimensions and relationships of the various tubes can be adjusted to take into consideration the turbulence of the reaction mixture, various tube sizes, etc. For example, if a probe such as shown in FIG. 5 is inserted into a highly turbulent reaction zone, it can be advantageous to adjust the dimension to increase the distance between the insertion of the reaction and inactivating agent at the end of the sample tube 71. Referring now to FIG. 6, an alternative system for obtaining a sample from a reaction process in accordance with practice of this invention is shown. Chamber 100 is connected to process stream zone 101. Reaction inactivating agent is inserted through tube 102 and blended with a sample of the process stream in chamber 100. The sample with which the reaction inactivating agent has been mixed is passed through conduit 103, valve 104, to vessel 105. The vessel is maintained at a reduced pressure and, as the sample enters, it is flashed into vapor. Solid products and liquids are withdrawn through the bottom of the vessel through valve 106. Vapor products are withdrawn through filter element 107 and passed through conduit 108, flow controller 109, and introduced to analyzer recorder 110 wherein the relative concentrations of the various constituents are determined. Back pressure regulator 111 maintains the desired pressure on the vessel 105.

The above-described sample system of FIG. 6 can be used to obtain a sample in a polypropylene-polyethylene copolymer process reactor or stream from the reactor, if it is desirable to know the propylene and ethylene concentrations in the liquid phase of the liquid-solids slurry. The amount of polyethylene in the copolymer is indicated by the amount of unreacted ethylene in the reaction, if flow rates in and out of the reactor are known. The apparatus depicted in FIG. 6 is particularly useful for obtaining this information since a sample cannot be withdrawn from the stream and flashed across a valve without plugging the valve. Soluble polymer is deposited in the valve and the light components are vaporized. Small solid particles of polymer along with the soluble polymer can completely plug the valve. A preferred reaction inactivating agent for the propylene-ethylene process described is acetylacetone dissolved in toluene. The continuously operating analyzer 50 is preferably a process chromatographic analyzer.

EXAMPLE I

A sampling system designed to withdraw a polymer solvent solution sample from a reactor train was evaluated. The polymer solvent samples were withdrawn from both the first and last reactors of the reactor train. Shortstop was added to the sample to minimize gel formation and buildup in the system. The shortstop immediately stopped the polymerization reaction when the sample entered the sample probe.

The sample probe used was the arrangement shown in FIG. 4 to sample the first reactor. Shortstop consisting of 23 percent rosin acid in toluene was added to the sample immediately after the sample entered the probe. As long as there was a flow into the sampling system none of the shortstop entered the reactor. When the glass tubing was completely plugged with polymer, the shortstop flow was increased from the initial rate of 0.42 to 1.2 cc per minute. No further polymer buildup was noticed. A passageway was made through the plugged ¼ inch glass tubing and the tube was placed back in the sample dump line. After about 12 hours of operation, the glass tube was washed free of polymer and gel. The ⅛ inch sample probe and lines were clean after about 50 hours of continuous operation.

A higher capacity sample probe was required on a higher viscosity stream to obtain 50 cc per minute flow from the last reactor. The probe used in the last reactor is shown in FIG. 5. An inline mixer was not used because of the high pressure drop across the mixer. A back pressure regulator on the pump outlet was not needed. Sample was withdrawn from the reactor at a rate of 50 cc per minute for 47 hours without any plugging or polymer buildup.

An additional test was run on the first reactor. The probe shown in FIG. 4 was used. All of the components used on the first reactor previously were used except the inline mixer. After five hours operation, polymer in the ¼ inch glass tube had almost completely plugged the line. A check on the shortstop addition system was made. The suction line of the shortstop pump was not in the shortstop solution. After the shortstop trouble was corrected, no additional polymer accumulated in the system. Most of the polymer buildup in the ¼ inch glass tube, caused by insufficient shortstop, was washed out in the next 36 hours of continuous operation by the flowing sample.

EXAMPLE II

In a batch process for the production of a polybutadiene polymer, a measurement of the viscosity is required for quality control. The system shown in FIG. 3 is used and the sampling probe inserted into a side stream coming from the reactor. Short stop, 2.3 percent rosin acid in toluene, is added and the viscosity measured by an appropriate viscometer shown in FIG. 3 as number 50. The measurement is made continuously during the batch operation and the system is flushed in the period between batches.

Reasonable variation and modification are possible within the scope of the foregoing disclosure, the drawing, and the appended claims to the invention, the essence of which is that there has been provided a method and apparatus for removal of a sample wherein a reaction inactivating agent is added to a sample at a point near the sample removal location to inactivate the sample.

I claim:

1. Sampling system for continuously obtaining a non-reactive polymer sample comprising in combination: a sample probe means wherein reaction inactivating agent is mixed with a continuously withdrawn polymer reaction sample to render the sample non-reactive; mixing means for blending and mixing said non-reactive sample; a pump for transporting said non-reactive sample; an analyzing means for said non-reactive sample; regulator means for maintaining sufficient pressure on the non-reactive sample; glass tubing means for visually observing polymer deposition from said non-reactive sample; sample dump means for collecting said non-reactive sample; container means containing reaction inactivating agent; pump means for drawing the flow of reaction inactivating agent to said sample probe means.

2. A system according to claim 1 in which the analyzing means is a viscometer.

3. A system for obtaining a non-reactive sample from a reaction mixture comprising: sample probe means wherein reaction inactivating agent can be mixed with a reaction mixture sample to inactivate said sample, an analyzing means for said non-reactive sample communicating with said sample probe means, pressure switch means connected to a valve adapted to measure pressure of said non-reactive sample, metering pump means for transporting said non-reactive sample, backpressure regulator means for maintaining pressure on said non-reactive sample, sample collecting means for collecting said non-reactive sample, reaction inactivating agent container means, and metering pump means for controlling the flow of said reaction inactivating agent to said sample probe, said pump means being controlled by said valve means responsive to said low pressure switch means, whereby reaction inactivating agent flow can be stopped if sample plugging results.

4. A system according to claim 3 in which the analyzing means is a viscometer.

5. A sample probe for obtaining a non-reactive sample from a reaction chamber comprising, in combination:

a tubular outer shell extending through a wall of said reaction chamber and terminating with a closed end a substantial distance within said reaction chamber, an open ended first tube for removing a sample from said reaction chamber extending from outside said reaction chamber through said outer shell and closed end and terminating within said reaction chamber beyond the closed end of said tubular shell, and a second tube for inserting reaction inactivating agent into said first tube near the terminal end of said first tube within said reaction chamber, said second tube extending from outside said reaction chamber through said outer shell and terminating and intersecting in open communication said first tube at a point immediately downstream from the end where a reaction sample enters said first tube whereby reaction inactivating agent can be inserted and mixed with the reaction mixture sample.

* * * * *